UNITED STATES PATENT OFFICE.

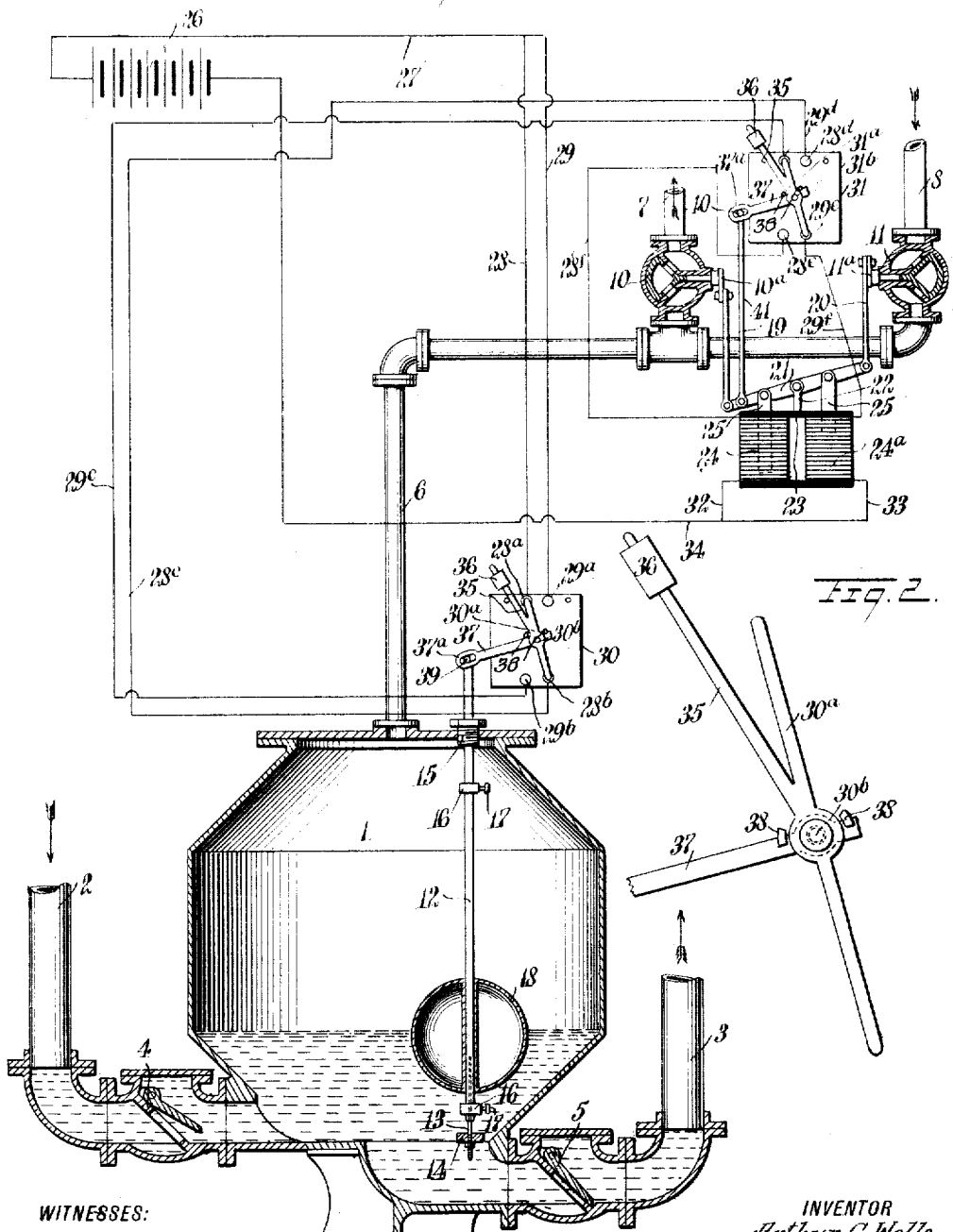

ARTHUR C. WELLS, OF AMITYVILLE, NEW YORK.

WATER AND SEWAGE LIFT.

1,025,079. Specification of Letters Patent. Patented Apr. 30, 1912.

Application filed July 25, 1910, Serial No. 573,623. Renewed March 14, 1912. Serial No. 683,703.

*To all whom it may concern:*

Be it known that I, ARTHUR C. WELLS, a citizen of the United States, and a resident of Amityville, in the county of Suffolk and State of New York, have invented a new and Improved Water and Sewage Lift, of which the following is a full, clear, and exact description.

My invention relates to water and sewage lifts, and it has for its object to provide one having a conduit leading to a tank with an inlet and an outlet, and valve means controlled electrically for connecting the conduit with the atmosphere when the tank is being filled, and with a supply of compressed air when the tank is filled for forcing the sewage through the outlet.

Another object of the invention is to provide a switch with means to operate it, and break the circuit immediately after the valve means has been operated, to prevent the waste of electric current.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in both views, and in which—

Figure 1 is a side elevation of the invention partially in section: and Fig. 2 is an enlarged view showing the arm of one of the switches, with the means for operating it.

By referring to the drawings, it will be seen that a tank 1 is provided, having an inlet 2 and an outlet 3, a check valve 4 commanding the inlet 2 and a check valve 5 commanding the outlet 3. Connected with the tank, preferably at its top, there is a conduit 6, having branches 7 and 8, commanded by rotary valves 10 and 11, respectively. In the tank 1 there is a rod 12 which is tubular at its lower end, a pin 13 being secured to a member 14 which, in turn, is secured to the tank, the upper end of the pin 13 being disposed in the tubular portion of the rod 12. This rod 12 is disposed for moving vertically in a bearing 15 in the top of the tank. Adjustably mounted on this rod 12, there are two collars 16, which are held in place by set screws 17. A float 18 is slidably mounted on the rod 12. Arms 10ª and 11ª are secured to the rotary valves 10 and 11, respectively, links 19 and 20 being provided for connecting these arms 10ª and 11ª with the arms of a lever 21, pivoted on a standard 22, which is, in turn, mounted on a member 23 secured to the solenoids 24 and 24ª. The solenoids 24 and 24ª are each provided with an armature 25, the armatures 25 being articulated to the lever 21. A battery 26 is provided for energizing these solenoids 24 and 24ª. Connected with one pole of the battery, is a wire 27, having two branches 28 and 29, which lead to the contact plates 28ª and 29ª of the switch 30, the contact plate 28ª being adapted to be connected with the contact plate 28ᵇ by the arm 30ª of the switch, and the contact plate 29ª being also adapted to be connected with the contact plate 29ᵇ by the said switch arm 30ª. The contact plate 28ᵇ is connected with the contact plate 28ᵈ by the wire 28ᶜ. The contact plate 29ᵇ is connected with the contact plate 29ᵈ by the wire 29ᶜ, these contact plates 28ᵈ and 29ᵈ forming parts of the switch 31. The contact plate 28ᵈ is adapted to be connected with the contact plate 28ᵉ of the said switch 31 by the switch arm 31ª, and the contact plate 29ᵈ of the said switch 31 is also adapted to be connected with the contact plate 29ᵉ by the said switch arm 31ª. The contact plate 28ᵉ is connected by a wire 28ᶠ with the solenoid 24, and the contact plate 29ᵉ is connected by a wire 29ᶠ with the solenoid 24ª. Wires 32 and 33 lead from these solenoids 24 and 24ª, these wires 32 and 33 being connected with a wire 34 which leads back to the battery 26.

As best shown in Fig. 2 of the drawings, the switch arms 30ª and 31ª have each an arm 35 secured thereto, a weight 36 being secured to each of these arms 35. Arms 37 are articulated to the pivots 30ᵇ and 31ᵇ of the switch-arms 30ª and 31ª, these arms 37 being provided with lugs 38, for engaging the switch arms 30ª and 31ª respectively. The arms 37 have slots 37ª, a pin 39 being secured in the slot 37ª in the arm 37 on the switch 30, this pin 39 being secured to the upper terminal of the rod 12. A pin 40 is disposed in the slot 37ª in the arm 37 mounted on the switch 31, this pin 40 being secured to a rod 41, which is articulated to one arm of the lever 21.

In using the invention, the collars are adjusted on the rod 12 and the connections are made as has been described. This having been done, when the water or sewage flows into the tank 1 through the inlet 2, it will raise the float 18, and, when the float continues to move upwardly, after it reaches the collar 16, it will lift the rod 12 by means of the pin and slot connection described and will cause the arm 37 on the switch 30 to move upwardly, the left lug 38 on the said arm 37 contacting with the switch arm 30ª and causing the upper portion of this switch arm 30ª to move to the right, and the lower portion to move to the left, thereby connecting the contact plates 29ª and 29ᵇ. When this has been done, the current will flow from the battery through the wire 27, the wire 29, the switch arm 30ª, the wire 29ᶜ to the contact plate 29ᵈ of the switch 31, the current passing through the arm 31ª of the said switch 31 to the contact plate 29ᵉ and through the wire 29ᶠ to the solenoid 24ª. This solenoid 24ª will be energized in this way, the current passing from the solenoid to the wire 33, to the wire 34 and back to the battery, and, as the solenoid is energized, it will draw inwardly its armature 25, thereby moving the right-hand portion of the lever 21 downwardly, the left-hand portion of the lever 21 being moved upwardly at the same time. This will, by means of the links 19 and 20, open the valve 11 and close the valve 10. The branch 8, commanded by the valve 11, is connected with a supply of compressed air, and, as the valve 11 is opened, this compressed air will flow through the conduit 6 into the tank 1 and will force out of the said tank 1 the sewage or water disposed therein, the sewage or water being forced out through the outlet 3, the check valve 4 preventing the water and sewage from flowing back through the inlet 2. When the lever 21 is moved to operate the valves 10 and 11, the rod 41 is also operated, which, by means of the pin and slot connection described, moves the arm 37 on the switch 31 upwardly, thereby drawing the upper end of the switch arm 31ª to the right, the lower end of the said switch arm being drawn to the left, thereby opening the circuit and preventing the passage of the current to further energize the solenoid 24ª. As the water and sewage is forced out of the tank 1 by the compressed air flowing through the branch 8 and the conduit 6, the float 18 is lowered. When nearly all the water and sewage in the tank 1 has been forced out through the outlet, the float 18 will strike the lower collar 16 on the rod 12, and, as the compressed air continues to force the water and sewage out of the tank 1 through the outlet 3, the float 18 will force the lower collar 16 on the rod 12 downwardly when, by means of the pin and slot connection described, the arm 37 on the switch 30 will be moved downwardly and the right-hand lug 38 on the said arm 37 will contact with the switch arm 30ª and will throw the upper arm of the said switch arm 30ª to the left, the lower arm of the said switch arm 30ª being thrown to the right. This will complete the circuit from the battery through the wire 27, the wire 28, the switch arm 30ª, which will connect the contact plate 28ª with the contact plate 28ᵇ, the current flowing through the wire 28ᶜ to the contact plate 28ᵈ of the switch 31, the current flowing from the contact plate 28ᵈ to the contact plate 28ᵉ through the switch arm 31ª and thus through the wire 28ᶠ to the solenoid 24. This current will energize the said solenoid, the current passing from the solenoid to the wire 32 and the wire 34 back to the battery. As the solenoid 24 is energized, it will cause its armature 25 to move downwardly, thereby operating the lever 21, and, by means of the links 19 and 20, opening the valve 10 and closing the valve 11. At the same time, by means of the rod 41, the arm 37 on the switch 31 will be drawn downwardly, thereby throwing the upper arm of the switch arm 31ª to the left and the lower arm of the switch arm 31ª to the right, breaking the circuit. As the valve 11 is closed, the supply of compressed air through the branch 8 is cut off. The branch 7 leads to the atmosphere, and, as the valve 10 is opened, the compressed air contained in the tank 1, is permitted to escape and the tank will be filled a second time by the flow of the water and sewage through the inlet 2, the sewage or water being prevented from flowing through the outlet 3 back into the tank by the check valve 5.

Having thus described my invention, I claim as new and desire to secure by Letters Patent:

1. In a water and sewage lift, a tank for receiving a liquid, having an inlet and outlet, each commanded by a check valve, a conduit leading to the tank, having two branches, two valves, one commanding each of the branches, two solenoids, a lever, two armatures articulated to the lever, one commanded by each of the solenoids, links connecting the lever with the valves commanding the branches respectively, two circuits connected with the solenoids respectively, a double switch in the circuits, and means for moving the switch when the liquid in the tank reaches a predetermined height.

2. In a water and sewage lift, a tank for receiving a liquid, having an inlet and outlet, each commanded by a check valve, a conduit leading to the tank, having two branches, two valves, one commanding each of the branches, two solenoids, a lever, two armatures articulated to the lever, one commanded by each of the solenoids, links connecting the lever with the valves commanding the branches respectively, two circuits connected with the solenoids respectively, two double switches in the circuits, each adapted for breaking one circuit as the other is closed respectively, means for operating one of the switches, adapted to be actuated by the lever, a float in the tank, and means for operating the other switch, adapted to be actuated by the float.

3. In a water and sewage lift, a tank having an inlet and an outlet, each commanded by a check valve, a conduit leading to the tank, having two branches, two valves, one commanding each of the branches, two solenoids, a pivoted lever, two armatures articulated to the lever, commanded by the solenoids respectively, links connecting the lever with the valves commanding the branches, two circuits connected with the solenoids respectively, a double switch in the circuits for breaking one circuit as the other is closed, respectively, a float in the tank, and means connecting the float with the switch, for operating the switch.

4. In a water and sewage lift, a tank having an inlet and outlet, each commanded by a check valve, a conduit leading to the tank, having two branches, two valves, one commanding each of the branches, two solenoids, a pivoted lever, two armatures articulated to the lever, commanded by the solenoids respectively, links connecting the lever with the valves commanding the branches, two circuits connected with the solenoids respectively, a double switch in the circuits for breaking one circuit as the other is closed respectively, a rod with collars, disposed in the tank and extending through an opening therein, a float disposed in the tank and slidably mounted on the rod between the collars, and means by which the rod is adapted for operating the switch.

5. In a water and sewage lift, a tank having an inlet and an outlet, each commanded by a check valve, a conduit leading to the tank, having two branches, two valves, one commanding each of the branches, two solenoids, a pivoted lever, two armatures articulated to the lever, commanded by the solenoids respectively, links connecting the lever with the valves commanding the branches, two circuits connected with the solenoids respectively, a double arm switch for closing one circuit as the other is opened respectively, a weighted arm on the switch for holding it in position when moved to close one of the circuits, a pivoted arm having lugs for engaging the arm of the switch for operating it, a float in the tank, and means connecting the float with the pivoted arm.

6. In a water and sewage lift, a tank having an inlet and an outlet, each commanded by a check valve, a conduit leading to the tank, having two branches, two valves, one commanding each of the branches, two solenoids, a pivoted lever, two armatures articulated to the lever, one commanded by each of the solenoids, links connecting the lever with the valves commanding the branches respectively, two circuits connected with the solenoids respectively, two double switches in the circuits, each adapted for breaking one circuit as the other is closed respectively, means for operating one of the switches, adapted to be actuated by the lever, a rod with collars, disposed in the tank and extending through an opening therein, a float disposed in the tank and slidably mounted on the rod between the collars, and means by which the rod is adapted for operating the other switch.

7. In a water and sewage lift, a tank, having an inlet and an outlet, a conduit connected with the tank, having two branches, valves commanding the branches respectively, a pivoted lever, links connecting the lever with the valves respectively, a solenoid, an armature connected with the lever and commanded by the solenoid, means for moving the lever against its direction of movement when the solenoid is energized, a circuit connected with the solenoid, a switch in the circuit, a float in the tank, and means connected with the float for operating the switch.

8. In a water and sewage lift, two solenoids, two armatures commanded by the solenoids respectively, a pivoted lever to which the armatures are articulated, a tank, a conduit leading to the tank, having two branches, two valves commanding the branches respectively, links connecting the lever with the valves, means for energizing the solenoids, one at a time, a float in the tank, and means connected with the float for commanding the second-mentioned means.

9. In a water and sewage lift, a tank, adapted to receive a fluid, a conduit leading to the tank and having two branches, two valves commanding the branches respectively, two solenoids, two armatures connected by the solenoids, a pivoted lever to which the armatures are articulated, links connecting the lever with the valves, for operating them, two circuits connected with the solenoids respectively, a double switch in the said circuits, means connected with the lever for operating the switch, a second double switch in the circuits, and means operable by the rise of a fluid in the tank for operating the second-mentioned switch.

10. In a water and sewage lift, a tank, adapted to receive a fluid, a conduit leading to the tank and having two branches, two valves commanding the branches respectively, two solenoids, two armatures connected by the solenoids, a pivoted lever to which the armatures are articulated, links connecting the lever with the valves, for operating them, two circuits connected with the solenoids respectively, a double arm switch in the said circuits for breaking one circuit as the other is closed respectively, a weighted arm on the switch, for holding the switch with one of the circuits closed, an arm with lugs, for engaging the switch for operating it, a link connecting the last-mentioned arm with the levers, a second double arm switch in the said circuits, for breaking one circuit as the other is closed respectively, a weighted arm on the second-mentioned switch, for holding it with one of its circuits closed, a pivoted arm with lugs, for engaging the second-mentioned switch, and means operable by the rise of a fluid in the tank, for operating the last-mentioned arm.

11. A water and sewage lift, a tank having an inlet and an outlet, each commanded by a check valve, a conduit leading to the tank having two branches, valve mechanism commanding the branches, two solenoids, a pivoted lever, two armatures articulated to the lever, commanded by the solenoids respectively, link mechanism connecting the lever with the valve mechanism, two circuits connected with the solenoids respectively, a double arm switch for closing one circuit as the other is opened, a weighted arm on the switch for holding it in position when moved to close one of the circuits, a pivoted arm having lugs for engaging the arm of the switch for operating it, and means for operating the pivoted arm.

12. In a water and sewage lift a tank for receiving a liquid having an inlet and an outlet each commanded by a check valve, a conduit leading to the tank having two branches, valve mechanism commanding the branches, two solenoids, a lever, two armatures articulated to the lever, commanded by the solenoids respectively, links connecting the lever with the valve mechanism, and means for energizing the solenoids one at a time.

13. In a water and sewage lift a tank for receiving a liquid having an inlet and an outlet each commanded by a check valve, a conduit leading to the tank having two branches, valve mechanism commanding the branches, two solenoids, a lever, two armatures articulated to the lever, one commanded by each of the solenoids, link mechanism connecting the lever with the valve mechanism, two circuits connected with the solenoids respectively, a double arm switch in the circuits, and means for moving the switch.

14. In a water and sewage lift a tank having an inlet and an outlet each commanded by a check valve, a conduit leading to the tank having two branches, valve mechanism commanding the branches, two solenoids, a pivoted lever, two armatures articulated to the lever, commanded by the solenoids respectively, means connecting the lever with the valve mechanism, two circuits connected with the solenoids, respectively, a double arm switch for closing one circuit as the other is opened respectively, means connecting the lever with the switch for operating it, a second switch in one of the circuits, and means for moving the last-mentioned switch when the liquid in the tank reaches a predetermined height.

15. In a water and sewage lift a tank for receiving a liquid having an inlet and an outlet each commanded by a check valve, a conduit leading to the tank having two branches, valve mechanism commanding the branches, two solenoids, a lever, two armatures articulated to the lever, one commanded by each of the solenoids, link mechanism connecting the lever with the valve mechanism, two circuits connected with the solenoids respectively, a double arm switch adapted for breaking one circuit as the other is closed respectively, and means connecting the lever with the double arm switch for operating the latter.

16. In a water and sewage lift a tank having an inlet and an outlet, a conduit connected with the tank having two branches, valve mechanism commanding the branches, a solenoid, an armature commanded by the solenoid, link mechanism connecting the solenoid with the valve mechanism for operating the latter, a circuit connected with the solenoid, a switch in the circuit, a weighted arm on the switch for holding the switch in position, a pivoted arm having lugs for engaging the arm of the switch, and means for operating the pivoted arm.

17. In a water and sewage lift a tank having an inlet and an outlet, a conduit connected with the tank having two branches, valve mechanism commanding the branches, a solenoid, an armature commanded by the solenoid, means connecting the solenoid with the valve mechanism for operating the latter, a circuit connected with the solenoid, a switch in the circuit, a weighted arm on the switch for holding the switch in position, a pivoted arm having lugs for engaging the arm of the switch, and a link connecting the said means and the pivoted arm.

18. In a water and sewage lift a tank for receiving a liquid having an inlet and an outlet, a conduit leading to the tank and having two branches, a valve mechanism commanding the branches, a solenoid, an armature commanded by the solenoid, a link mechanism for connecting the solenoid with the valve mechanism for operating the latter, a circuit connected with the solenoid, a switch in the circuit, and means for operating the switch.

19. In a water and sewage lift, a tank having an inlet and an outlet, a conduit leading to the tank and having two branches, a valve mechanism commanding the branches, a solenoid, an armature commanded by the solenoid, means connecting the solenoid with the valve mechanism for operating the latter, a circuit connected with the solenoid, a switch in the circuit, and means for operating the switch.

In testimony whereof, I have signed my name to this specification in the presence of two subscribing witnesses.

ARTHUR C. WELLS.

Witnesses:
 Henry W. Archibald,
 Theo. S. Valentine.